Figure 2:
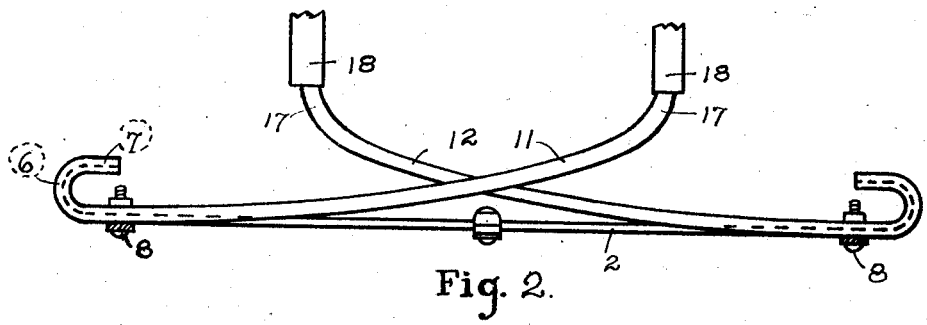

Feb. 15, 1927. 1,617,824

J. W. SAFFOLD

BUMPER

Filed June 18, 1926

INVENTOR.
James Webb Saffold,
BY
Fay, Oberlin & Fay,
ATTORNEYS.

Patented Feb. 15, 1927.

1,617,824

UNITED STATES PATENT OFFICE.

JAMES WEBB SAFFOLD, OF CLEVELAND, OHIO.

BUMPER.

Application filed June 18, 1926. Serial No. 116,806.

This invention, as indicated, relates to a bumper. More particularly, it comprises a bumper having supporting members of more than customary length which may be adapted to serve in part as impact members. It also includes a construction eliminating curved portions of short radius which provide points of fracture or structural weakness.
Heretofore in bumper construction, it has been the practice to provide rigid bumpers supported on rigid separate supporting bars, which bumpers have the characteristic of transmitting the shock directly to the object collided with and causing the yielding of said object or injury to the vehicle carrying the bumper, or fracture of the bumper itself or its supports. Another form of construction has been to provide a resilient bumper at the ends of rigid supporting arms. Such bumpers are capable of absorbing slight shocks in the resilient structure but have the disadvantage of being easily deformable or under severe stress of fracturing usually at some point along the supporting arms.

A still further general type of bumper construction is to provide resilient bumpers and resilient supporting arms, in some forms such supporting arms being continuations of the impact portion of such bumpers and in other forms being separate resilient members suitably connected with the impact portion of the structure. In many instances, however, the impact portion of the bumper itself embodies curves of short radius or such supporting arms include such sharply curved portions. Likewise the supporting arms are usually of relatively short length and although intended to act as shock absorbing spring members, their range of action is relatively limited and heavy impact will readily deform or fracture the same. Such devices therefore usually fail under severe usage at the points of sharp curvature of the impact members or at some point along the length of the supporting portions of said structures.

The present invention has for its principal object the avoidance of the disadvantages referred to through the provision of a bumper structure which will embody a maximum flexibility and all of the parts of which will cooperate in resisting a shock. Another object of the invention is to eliminate curves of short radius in the portion of the bumper subjected to bending strains and to provide for a long radius of curvature in the supporting portions of the bumper structure. A further object of the invention is to provide elements which serve a combined impact resisting and bumper supporting function and which may be joined with impact resisting elements to form bumpers of unusual protective height with lightness of weight and simplicity of construction. Another object of said invention is to provide a bumper having a satisfactory appearance in connection with standard form of vehicle body designs without being cumbersome and expensive to manufacture and without sacrificing in any degree the maximum total resiliency of the bumper structure. A still further object of the invention is to provide a bumper which will not only resist impacts upon the ends or across the length or at the central point of the impact portion of the bumper but also which will act with full resiliency when the impact is delivered from the rear of the bumper against one of the projecting corners thereof. Other and further objects of the invention will appear in the course of the following description. To the accomplishment of the foregoing and related ends, said invention, then consists of the means hereinafter fully described and particularly pointed out in the claims.

The accompanying drawing and the following description set forth in detail certain mechanism embodying the invention, such disclosed means constituting, however, but one of various mechanical forms in which the principle of the invention may be used.

In said accompanying drawing:

Figure 1:
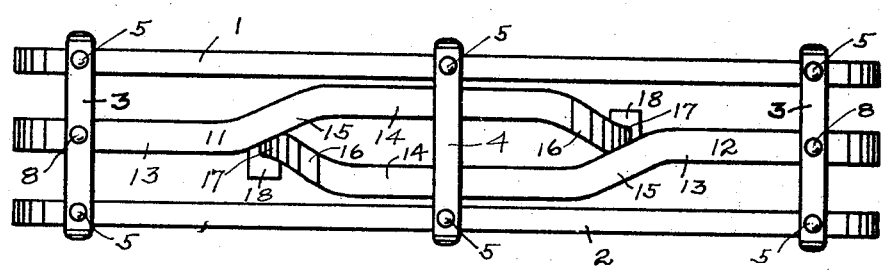
Figure 4:
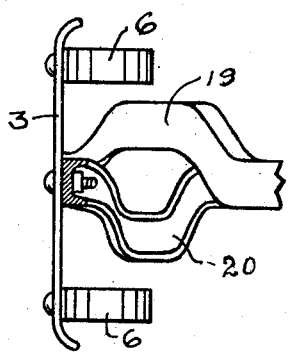
Figure 3:
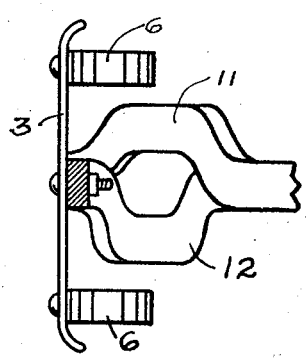

Fig. 1 is a front elevation of one form of bumper embodying the principles of my invention shown as applied to the end of the frame of a motor vehicle; Fig. 2 is a top plan view partly in section of the bumper shown in Fig. 1; Fig. 3 is an end view, partly in section, of the bumper shown in Figs. 1 and 2; and Fig. 4 is a view similar to Fig. 3 showing a modified form of supporting members.

In the bumper construction embodying the principles of my invention illustrated in the drawing, a pair of horizontal impact bars 1, 2, preferably made of strips of spring steel, extending parallel with each other transversely across the entire length of the bumper structure, are held in spaced relation by means of a plurality of vertical spacing plates or cross bars 3 adjacent their respective ends. A central spacing plate 4 may also be employed, or, if desired, a plurality of such spacing plates may be embodied in the construction, spaced at suitable points across the bumper. The spacing bars are preferably connected to the outer faces of the horizontal impact members by means of bolts 5 which may be of the customary form having rounded heads and squared shanks (not shown) to engage squared holes in said impact members and being held in position by nuts secured on to the threaded ends of said bolts in the usual manner. The cross bars are preferably formed of strips of spring steel of substantially the same width as said impact members, but are preferably of heavier gauge as it is desirable to have said bars very rigid. The ends of said cross bars preferably project a slight distance beyond the upper and lower edges of the horizontal members, and are curved rearwardly, to improve the appearance of the bumper structure and to serve as abutments to be engaged by objects such as bumpers on other cars when said bumpers are brought into engagement. The horizontal impact members may be of any desired shape but are shown in the drawing as having straight body portions for substantially the entire length of said members and as having their extreme end portions 6 bent rearwardly upon curves of short radius, the rearward terminal portions 7 being straight and parallel to said body portions for a short distance and extending to a point substantially in alignment with the central line of the bolts connecting said end cross bars with said horizontal impact members. Said terminal portions of the impact bars thus do not interfere with free access to the securing bolts 5.

The central cross bar 4 is provided with similar bolts 5 adjacent its ends to connect it to the central portions of said horizontal impact members. The ends of said central cross bar preferably project beyond the upper and lower edges of said impact bars and are curved rearwardly in like manner to said end cross bars 3. The end cross bars are provided at central points with apertures adapted to receive bolts 8 by means of which they may be secured to the intermediate bumper members 11, 12.

The intermediate or supporting bumper members 11, 12 are preferably formed of spring steel of somewhat heavier gauge than that of the impact members. Said members are of identical shape but are positioned reversely to each other in the bumper structure as assembled. Said members are of curved form as viewed from the top, as is clearly shown in Fig. 2, and are preferably shaped in the manner shown in Fig. 1 to provide the appearance of an open central loop as viewed in front elevation. Thus each of said members has a substantially horizontally extending outer portion 13 and a horizontally extending central portion 14 connected to said portion 13 by an obliquely extending portion 15. At the opposite end, the horizontal central portion 14 is formed with an obliquely extending portion 16 which has a rearwardly extending end portion 17 lying in the same horizontal plane as the first mentioned horizontal portion 13.

The horizontal portion 13 is apertured adjacent its end to receive the securing bolt 8, heretofore referred to, which serves to join the end of said member to the corresponding cross bar. The ends of the horizontal portions outwardly of the end cross bars are curved rearwardly and have parallel end portions exactly similar to the ends of horizontal impact members 1 and 2 heretofore described. The inner end portions 17 of the intermediate supporting members 11 and 12 are secured in any suitable manner to the frame members 18 of the vehicle to which the bumper structure is attached. Instead of making the supporting members 11 and 12 of flat strips, it may be found desirable to form them from channel strips or strips of I-section. In Fig. 4 inwardly faced channel strips 19, 20, are shown, as supporting members, the remaining structure being unchanged.

It is of course to be understood that the principle of my invention may be embodied in a bumper having a single horizontal impact member, or any desired number of such members, or that the supporting members 11, 12 may be of different outline as viewed in front elevation. It is desirable, however, that said supporting members 11 and 12 have adequate clearance from each other in order that full range of flexibility for the bumper structure may be provided.

The structure illustrated has been found to permit the construction of a bumper having a height of 14 inches without giving such bumper an appearance of clumsiness of design and without on the other hand making said bumper appear unsubstantial or inadequate to resist heavy impacts. The height of the bumper thus provided is much greater than that of three-bar bumpers of usual construction and is even greater than four-bar bumpers which usually are about 10 inches high. As viewed in front elevation, the bumper presents the appearance of a combination of the central open loop type of bumper across the middle area and of a parallel impact bar bumper across its upper and lower marginal portions. The appearance is very pleasing to the eye and in addition thereto full impact resisting capacity is provided for the bumper structure because of the intermediate supporting members serving adjacent their outer ends as impact resisting members, said outer ends lying substantially in the plane of the horizontal impact members.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A bumper for vehicles having an impact portion and a supporting portion, said supporting portion comprising a plurality of curved members crossing each other at an intermediate point and connected at their outer ends with said impact portion and at their opposite ends solely with said vehicle.

2. A bumper for vehicles having an impact portion and a supporting portion, said supporting portion comprising a pair of curved members crossing each other at an intermediate point and connected at their outer ends with said impact portion and at their opposite ends solely with said vehicle.

3. A bumper for vehicles having an impact portion and a supporting portion, said supporting portion comprising a pair of curved members crossing each other at an intermediate point and connected at their outer ends with said impact portion and at their opposite ends solely with the respective frame members of a motor vehicle.

4. A bumper for vehicles having in combination an impact portion and a supporting portion, said supporting portion comprising a pair of curved crossed spring bars connected at their forward ends with said impact portion and at their opposite ends solely with said vehicle.

5. A bumper for vehicles having in combination an impact portion and a supporting portion, said supporting portion comprising a pair of curved crossed spring bars formed of inwradly faced channel members connected at their forward ends with said impact portion and at their opposite ends with said vehicle.

6. A bumper for vehicles having in combination an impact member, and a pair of crossed spring arms connected at one end solely to the vehicle supporting said impact member, each of said spring arms having a bowed intermediate portion to afford clearance from its companion spring arm.

7. A bumper for vehicles having in combination a parallel bar horizontal impact member, and a two bar supporting means providing an open center loop intermediate portion as viewed from the front.

8. A bumper for vehicles having in combination an impact portion comprising a pair of parallel horizontal bars, cross-bars adjacent the ends of said horizontal bars supporting the same in spaced relation, a pair of curved supporting bars connected at their outer ends with said cross-bars and at their inner ends with the respective frame members of a motor vehicle farthest from said point of connection with said cross-bars.

9. A bumper for vehicles having in combination impact portion comprising a pair of parallel horizontal bars, cross-bars adjacent the ends of said horizontal bars supporting the same in spaced relation, an intermediate cross-bar attached to said horizontal bars, a pair of curved supporting bars connected at their outer ends with said end cross-bars and at their inner ends with the respective frame members of a motor vehicle farthest from said point of connection with said end cross-bars.

10. A bumper for vehicles, having in combination an impact portion comprising a pair of parallel horizontal bars, cross-bars adjacent the ends of said horizontal bars supporting the same in spaced relation, a pair of curved supporting bars in crossed relation to each other connected at their outer ends with said cross-bars and at their inner ends with the frame members of a motor vehicle.

11. A bumper for vehicles having in combination an impact portion comprising a pair of parallel horizontal bars, cross-bars adjacent the ends of said horizontal bars supporting the same in spaced relation, a pair of curved supporting bars in crossed relation to each other and formed of inwardly-facing channel members connected at their outer ends with said cross-bars and at their inner ends with the frame members of a motor vehicle.

12. A bumper for vehicles having in combination a parallel bar horizontal impact member, and a two bar supporting means providing an open center loop intermediate portion as viewed from the front, said supporting bars lying in the plane of said impact member at their outer ends, and their opposite ends being disposed at right angles thereto and connected with the vehicle structure at points adjacent the point of attachment of companion bars to said impact member.

13. A bumper for vehicles having in combination a pair of spring members each adapted to be supported upon the end of a frame member of a vehicle and supporting an impact member at its outer end at a point adjacent the projected line of the opposite frame member.

14. A bumper for vehicles having in combination a pair of curved spring members each having its ends lying in the same plane and having an intermediate portion displaced from said plane, an impact member supported by the outer ends of said spring members, the inner ends of each of said spring members being connected with the frame members of said vehicle farthest from the respective points of attachment to said impact member.

Signed by me, this 9th day of June, 1926.

JAMES WEBB SAFFOLD.